(12) United States Patent
Eguchi

(10) Patent No.: US 10,649,184 B2
(45) Date of Patent: May 12, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Yosuke Eguchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/280,550

(22) Filed: Sep. 29, 2016

(65) Prior Publication Data

US 2017/0108671 A1    Apr. 20, 2017

(30) Foreign Application Priority Data

Oct. 14, 2015 (JP) .................................. 2015-203191

(51) Int. Cl.
| | | |
|---|---|---|
| G02B 9/00 | (2006.01) | |
| G02B 13/04 | (2006.01) | |
| G02B 13/00 | (2006.01) | |
| G02B 27/00 | (2006.01) | |

(52) U.S. Cl.
CPC ......... *G02B 13/04* (2013.01); *G02B 13/0045* (2013.01); *G02B 27/0025* (2013.01)

(58) Field of Classification Search
CPC ... G02B 3/14; G02B 9/64; G02B 9/34; G02B 9/62; G02B 9/60; G02B 13/18; G02B 13/0045; G02B 13/004; G02B 15/167; G02B 15/161; G02B 15/24; G02B 15/163; G02B 27/0062

USPC .................................................. 359/642–830
See application file for complete search history.

(56) References Cited

U.S. PATENT DOCUMENTS

| | | | |
|---|---|---|---|
| 6,844,991 B2 | 1/2005 | Mizuguchi | |
| 7,046,458 B2 | 5/2006 | Nakayama | |
| 2004/0021958 A1 | 2/2004 | Mizuguchi | |
| 2006/0001985 A1 | 1/2006 | Tada | |
| 2013/0120852 A1 | 5/2013 | Sato | |
| 2015/0131165 A1* | 5/2015 | Nakamura | G02B 15/167 359/694 |
| 2015/0185437 A1* | 7/2015 | Suzuki | G02B 13/04 359/754 |
| 2015/0346467 A1* | 12/2015 | Tomioka | G02B 13/009 359/682 |
| 2016/0062090 A1* | 3/2016 | Kawamura | G02B 27/0062 359/686 |
| 2017/0108679 A1 | 4/2017 | Eguchi | |

FOREIGN PATENT DOCUMENTS

| | | |
|---|---|---|
| CN | 101713862 A | 5/2010 |
| CN | 101750724 A | 6/2010 |
| CN | 102338926 A | 2/2012 |

(Continued)

*Primary Examiner* — Mahidere S Sahle
(74) *Attorney, Agent, or Firm* — Canon U.S.A., Inc. IP Division

(57) ABSTRACT

At least one embodiment of an optical system includes, in order from an object side to an image side, a front unit having a plurality of lenses, an aperture stop, and a rear unit having a positive refractive power. In at least one embodiment, a positive lens and three or more negative lenses are disposed in the front unit, and the material of negative lenses included in the front unit, the focal length of the front unit, and the focal length of the entire optical system are set appropriately.

14 Claims, 14 Drawing Sheets

(56) References Cited

FOREIGN PATENT DOCUMENTS

| | | |
|---|---|---|
| CN | 101713862 B | 8/2012 |
| CN | 104620149 A | 5/2015 |
| CN | 104755982 A | 7/2015 |
| CN | 204666943 U | 9/2015 |
| CN | 105388598 A | 3/2016 |
| EP | 1004915 A1 | 5/2000 |
| EP | 1837691 A1 | 9/2007 |
| EP | 2407809 A1 | 1/2012 |
| JP | H07-084180 A | 3/1995 |
| JP | H08-171053 A | 7/1996 |
| JP | H11-052229 A | 2/1999 |
| JP | 2006-17837 A | 1/2006 |
| JP | 2008-003108 A | 1/2008 |
| JP | 2008-129403 A | 6/2008 |
| JP | 2010-139766 A | 6/2010 |
| JP | 2011-002503 A | 1/2011 |
| JP | 2011-065138 A | 3/2011 |
| JP | 2011-095488 A | 5/2011 |
| JP | 2011-107188 A | 6/2011 |
| JP | 2012-226042 A | 11/2012 |
| JP | 2013-003288 A | 1/2013 |
| JP | 2013-050674 A | 3/2013 |
| JP | 2013-105053 A | 5/2013 |
| JP | 2014-041196 A | 3/2014 |
| JP | 2014-186306 A | 10/2014 |
| JP | 2014-215294 A | 11/2014 |
| JP | 2014-215594 A | 11/2014 |
| JP | 2015-096927 A | 5/2015 |
| WO | 2014/041775 A1 | 3/2014 |
| WO | 2014/068860 A1 | 5/2014 |

\* cited by examiner

OPTICAL SYSTEM AND IMAGE PICKUP APPARATUS INCLUDING THE SAME

BACKGROUND OF THE INVENTION

Field of the Invention

The present disclosure relates to an optical system, including a fish-eye lens, and an image pickup apparatus including the optical system, and is suitably used for, for example, an image pickup apparatus using an image pickup element, such as a digital still camera, a video camera, a monitoring camera, or a broadcasting camera, or an image pickup apparatus such as a camera using a silver-halide film.

Description of the Related Art

In recent years, image pickup apparatuses using a solid-state image pickup element, such as a monitoring camera and a video camera, have been highly functionalized and entirely reduced in size. An optical system used in these apparatuses is required to have a compact size and high optical performance. Further, the optical system is required to have a wide viewing angle to enable image taking in a wide range by a single image pickup apparatus.

A fish-eye lens is known as an optical system that allows a region having a total angle of view of about 180 degrees to be imprinted within an image circle of a specific size. Japanese Patent Laid-Open No. 2006-17837 discloses a fish-eye lens in which a positive lens and three or more negative lenses are disposed on an object side of an aperture stop to enhance optical performance.

Since the negative lenses disposed on the object side of the aperture stop have strong refractive power to widen the viewing angle in the fish-eye lens, axial chromatic aberration and lateral chromatic aberration are apt to occur. The optical system known as the fish-eye lens is required to be properly corrected for axial chromatic aberration and lateral chromatic aberration.

In the optical system disclosed in Japanese Patent Laid-Open No. 2006-17837, the material of the negative lenses disposed on the object side of the aperture stop is not properly set, and the refractive power of a front unit on the object side of the aperture stop is also not properly set. Hence, axial chromatic aberration and lateral chromatic aberration are apt to remain.

SUMMARY OF THE INVENTION

An optical system according to an aspect of the present disclosure includes, in order from an object side to an image side, a front unit including a plurality of lenses, an aperture stop, and a rear unit having a positive refractive power. The front unit includes a positive lens and three or more negative lenses. The optical system satisfies the following conditional expressions:

$$\theta gF + 0.00163 \times vd > 0.665;$$

$$vd < 30.00; \text{ and}$$

$$-0.30 < f/ff < 0.25,$$

where $vd$ and $\theta gF$ respectively represent an Abbe number and a partial dispersion ratio of a material of a negative lens having a smallest Abbe number among the negative lenses included in the front unit, ff represents a focal length of the front unit, and f represents a focal length of the optical system.

According to other aspects of the present disclosure, one or more additional optical systems, one or more image pickup apparatuses, and one or more methods for use with same are discussed herein. Further features of the present disclosure will become apparent from the following description of exemplary embodiments with reference to the attached drawings.

DESCRIPTION OF THE EMBODIMENTS

At least one embodiment of an optical system and an image pickup apparatus including the optical system according to the present disclosure will be described in detail below with reference to the attached drawings. At least one embodiment of the optical system according to the present disclosure includes, in order from an object side to an image side, a front unit having a plurality of lenses, an aperture stop, and a rear unit having a positive refractive power.

Figure 1:
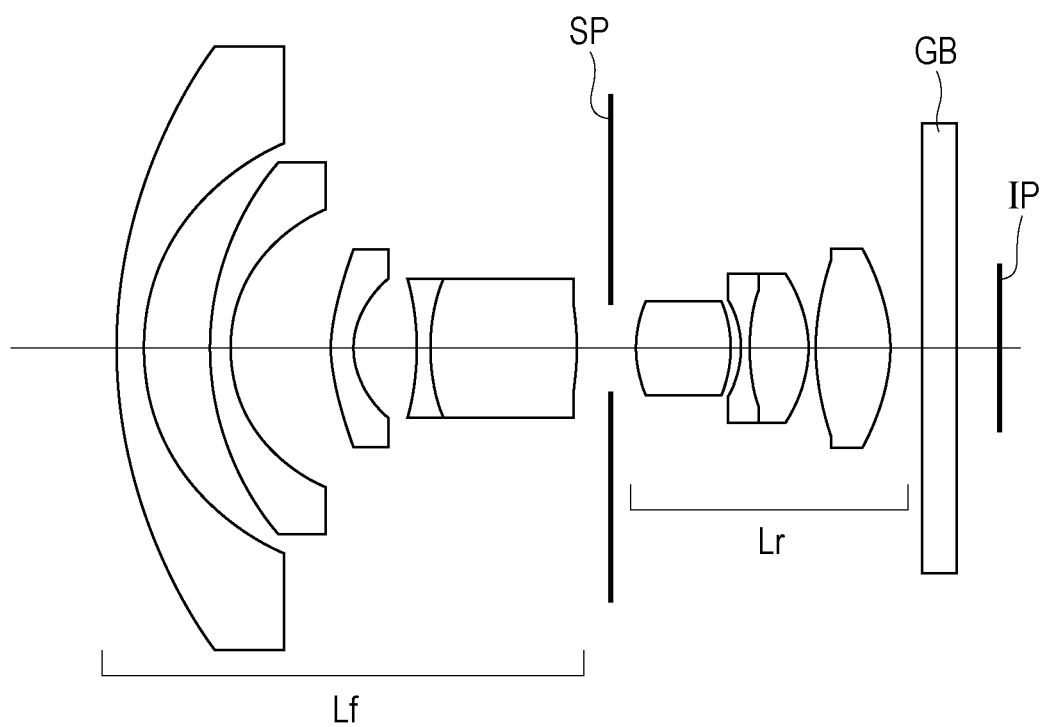
FIG. 1 is a lens sectional view of an optical system according to a first embodiment.
Figure 2:
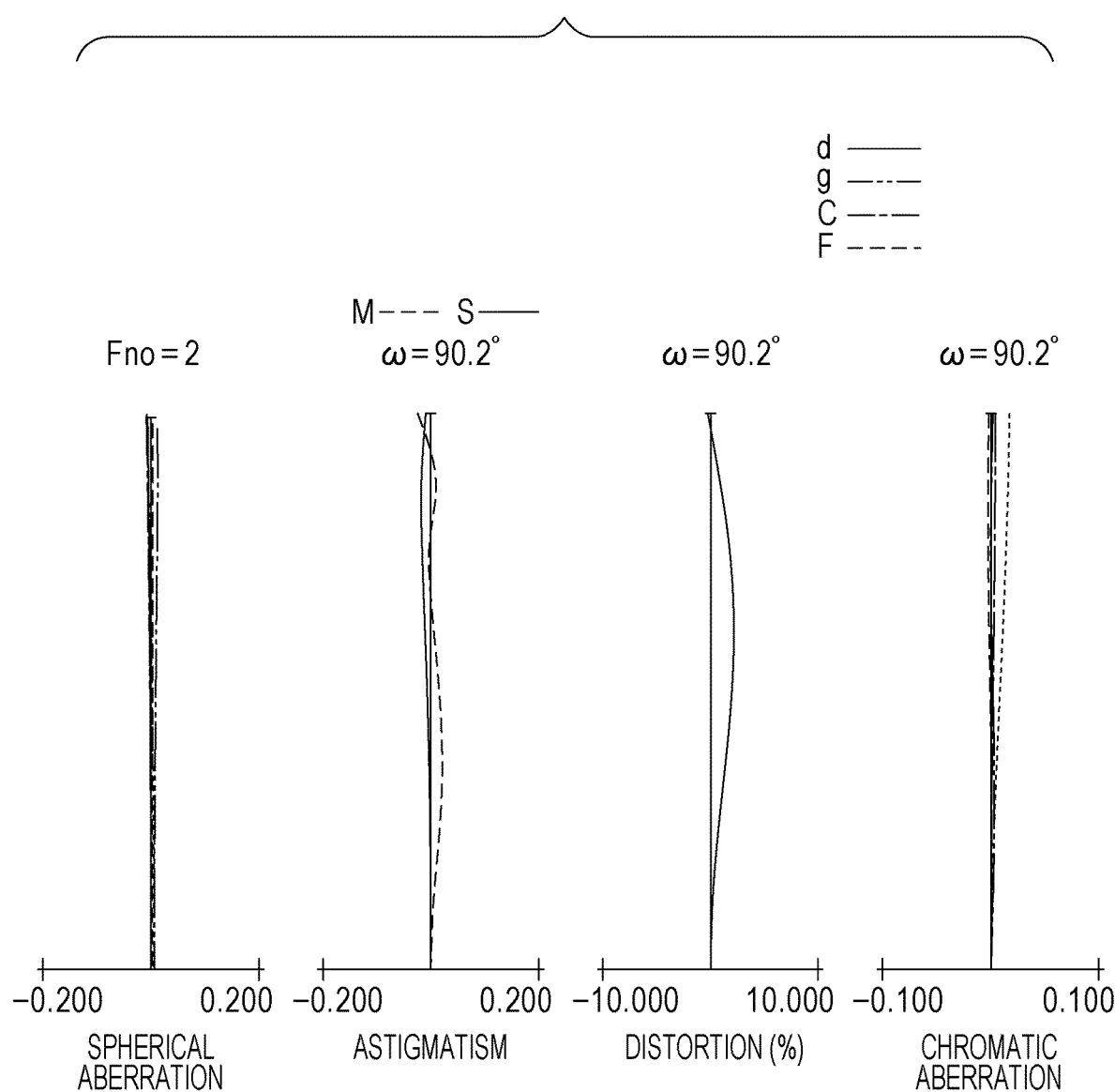
FIG. 2 is an aberration diagram of the optical system according to the first embodiment.
Figure 3:
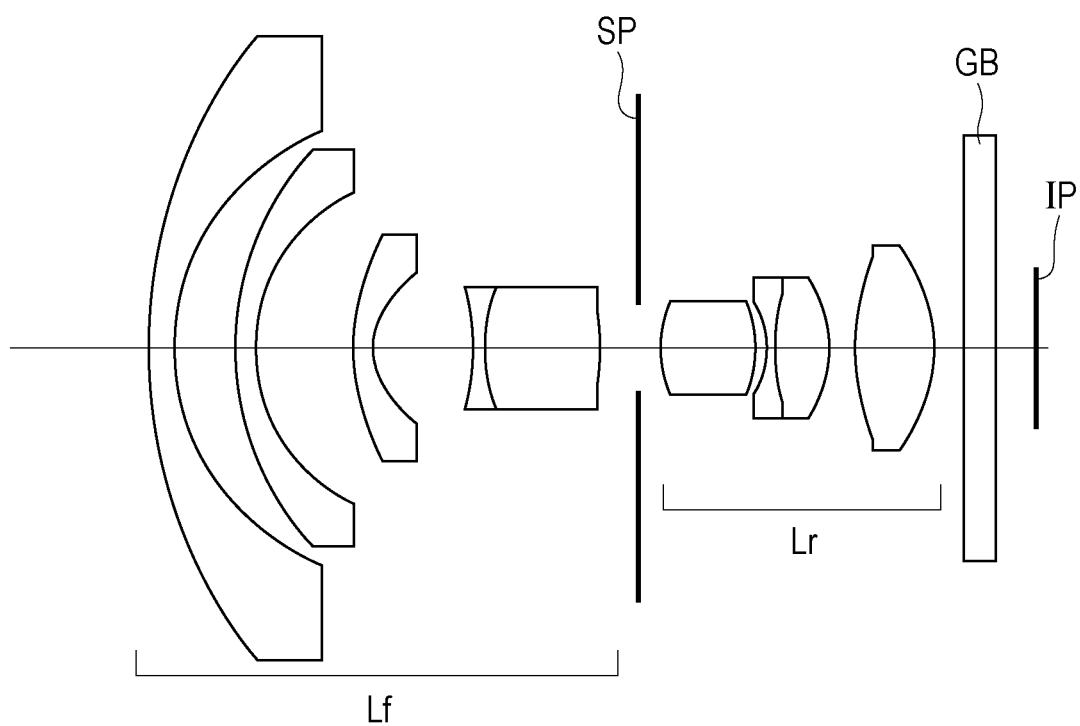
FIG. 3 is a lens sectional view of an optical system according to a second embodiment.
Figure 4:
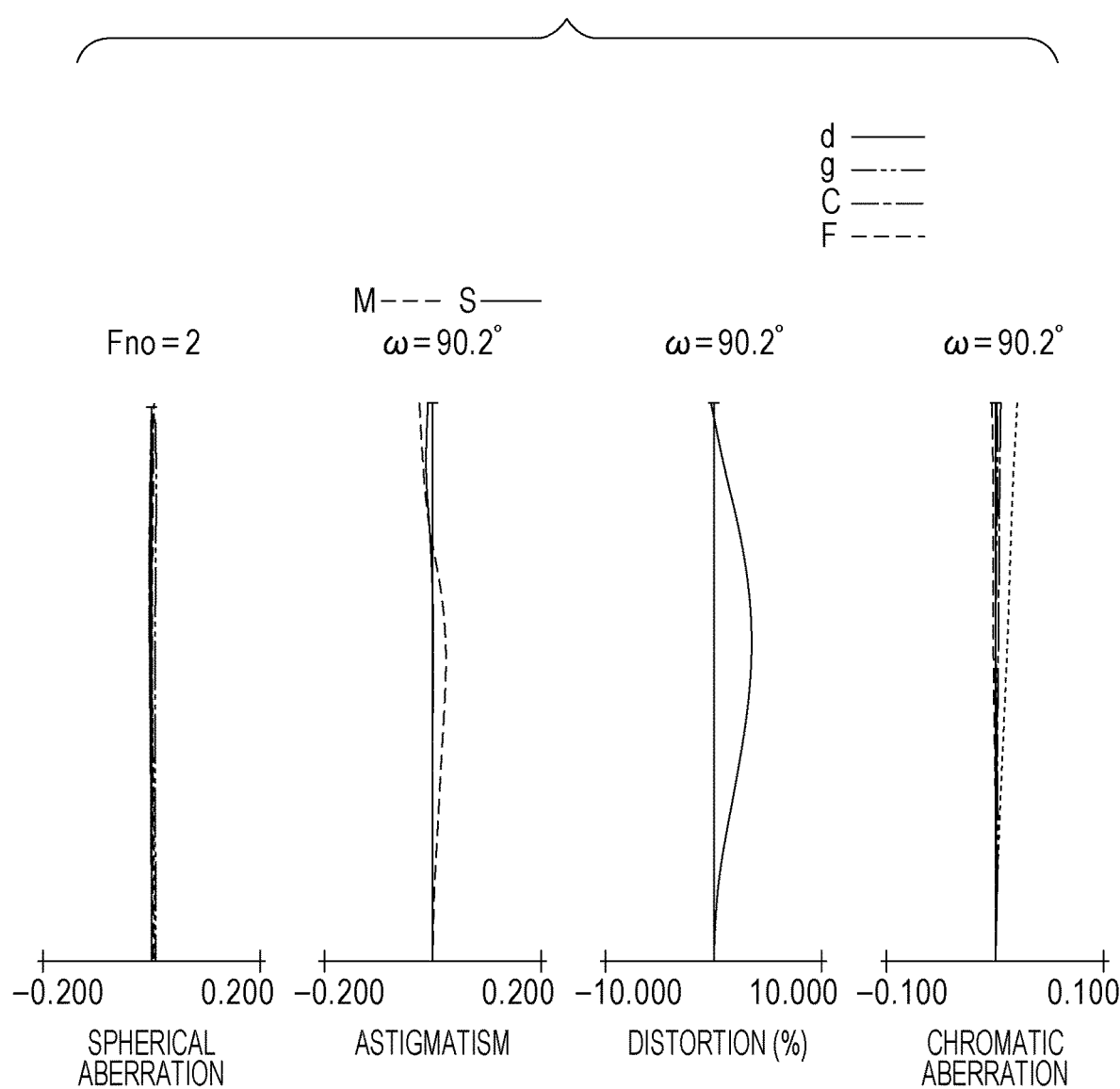
FIG. 4 is an aberration diagram of the optical system according to the second embodiment.
Figure 5:
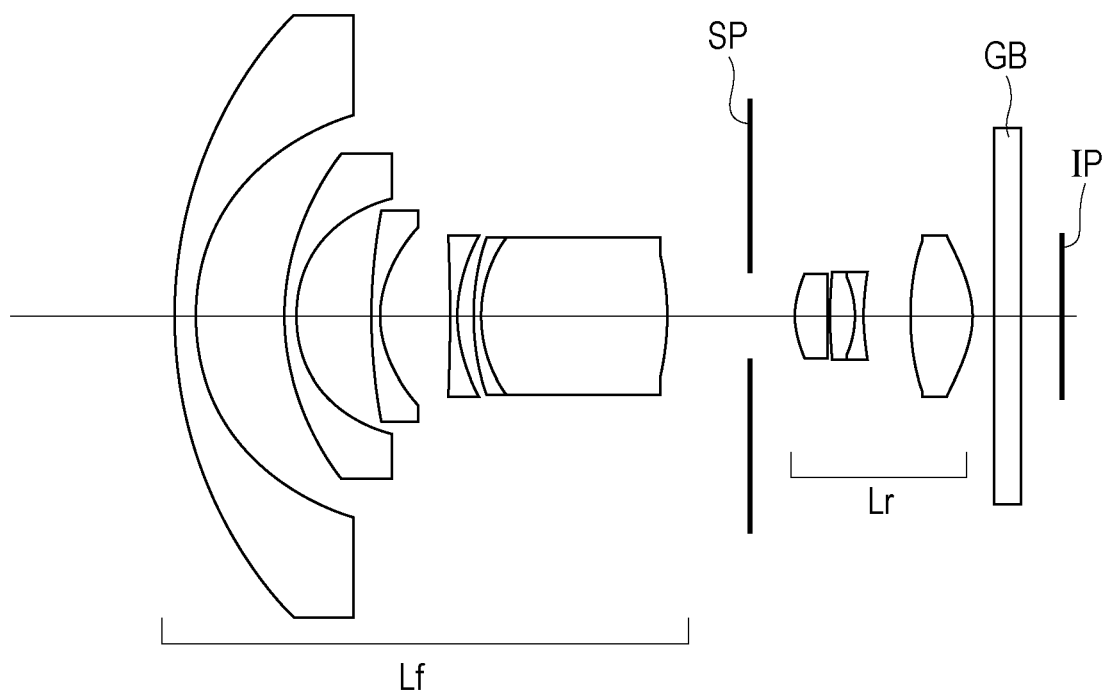
FIG. 5 is a lens sectional view of an optical system according to a third embodiment.
Figure 6:
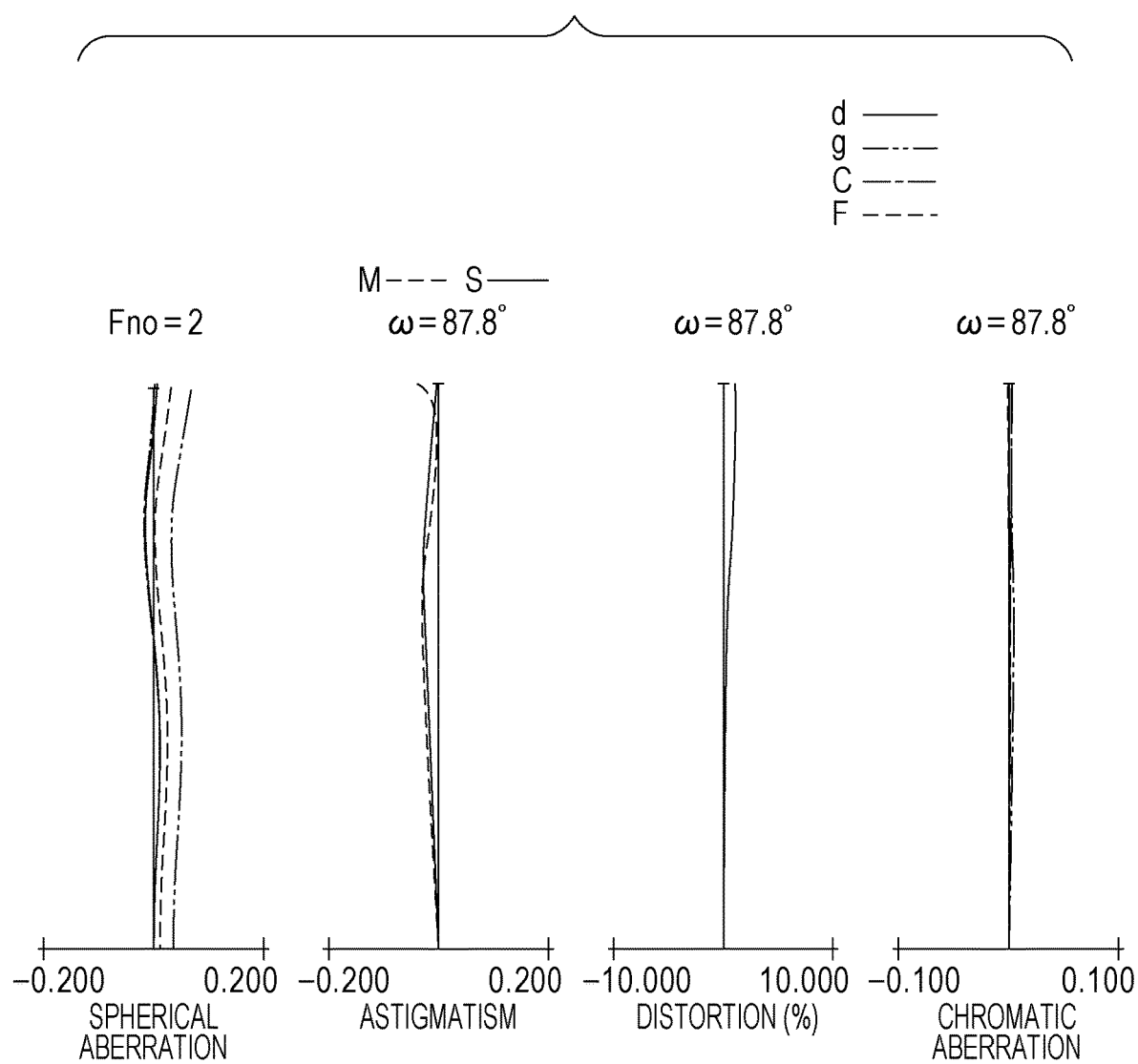
FIG. 6 is an aberration diagram of the optical system according to the third embodiment.

FIG. 1 is a lens sectional view of an optical system according to a first embodiment. FIG. 2 is an aberration diagram of the optical system of the first embodiment. The optical system of the first embodiment has a half angle of view of 90.20° and an F-number of about 2.00. FIG. 3 is a lens sectional view of an optical system according to a second embodiment. FIG. 4 is an aberration diagram of the optical system of the second embodiment. The optical system of the second embodiment has a half angle of view of 90.20° and an F-number of about 2.00. FIG. 5 is a lens sectional view of an optical system according to a third embodiment. FIG. 6 is an aberration diagram of the optical system of the third embodiment. The optical system of the third embodiment has a half angle of view of 100.00° and an F-number of about 2.00.

Figure 7:
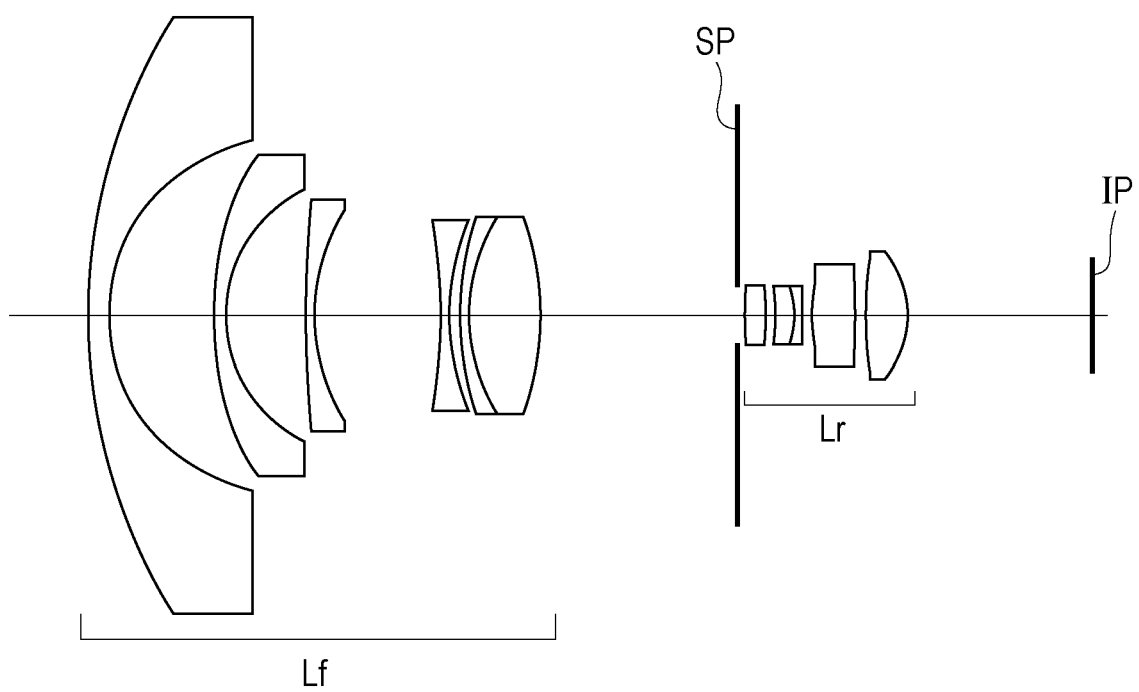
FIG. 7 is a lens sectional view of an optical system according to a fourth embodiment.
Figure 8:
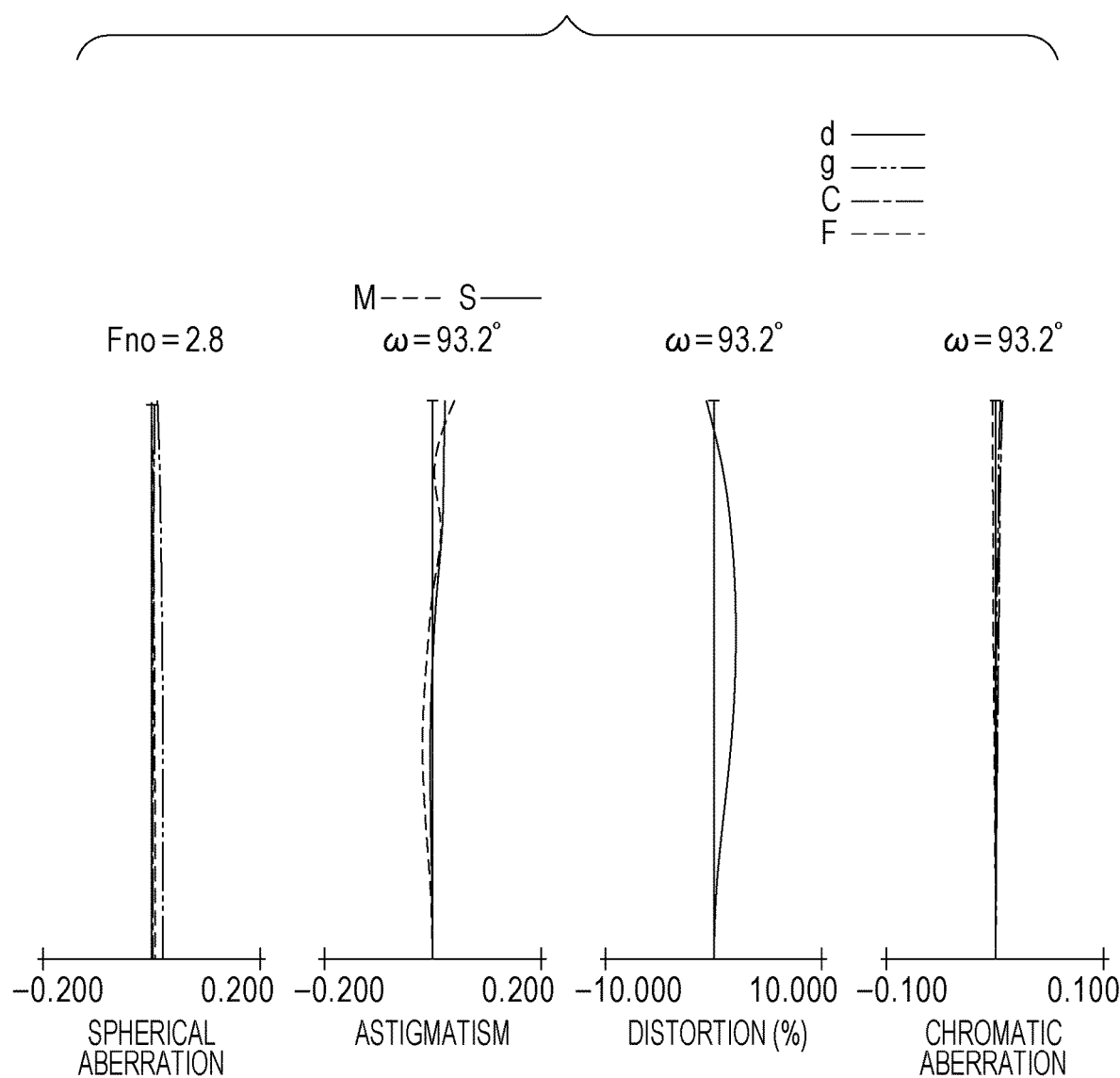
FIG. 8 is an aberration diagram of the optical system according to the fourth embodiment.
Figure 9:
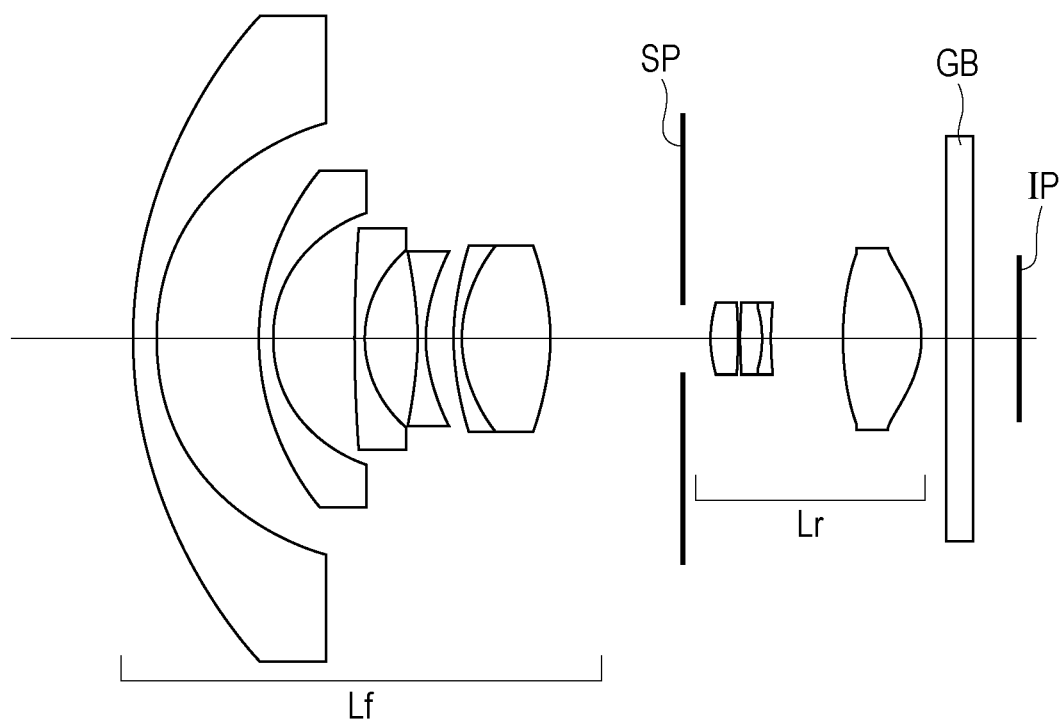
FIG. 9 is a lens sectional view of an optical system according to a fifth embodiment.
Figure 10:
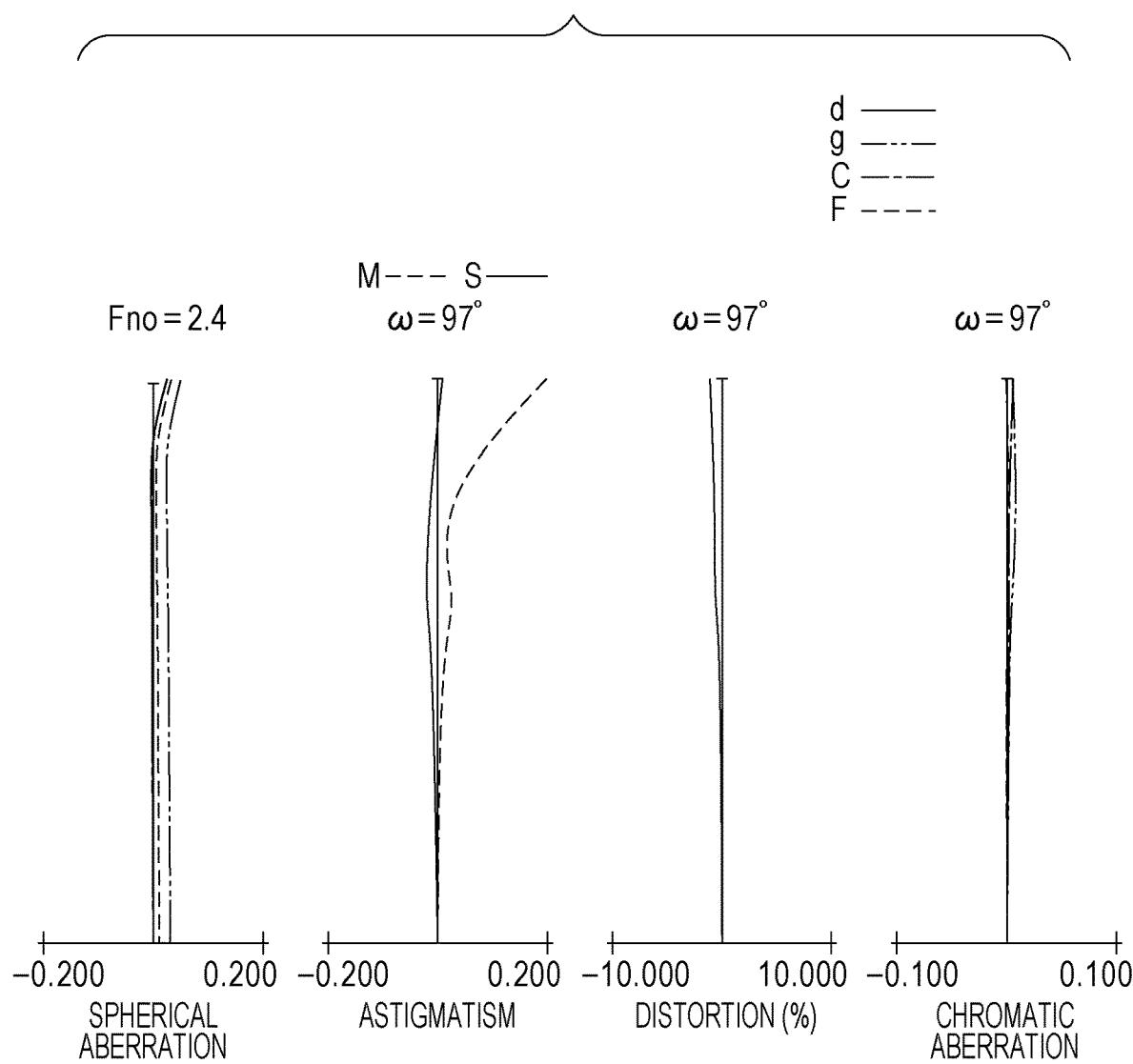
FIG. 10 is an aberration diagram of the optical system according to the fifth embodiment.
Figure 11:
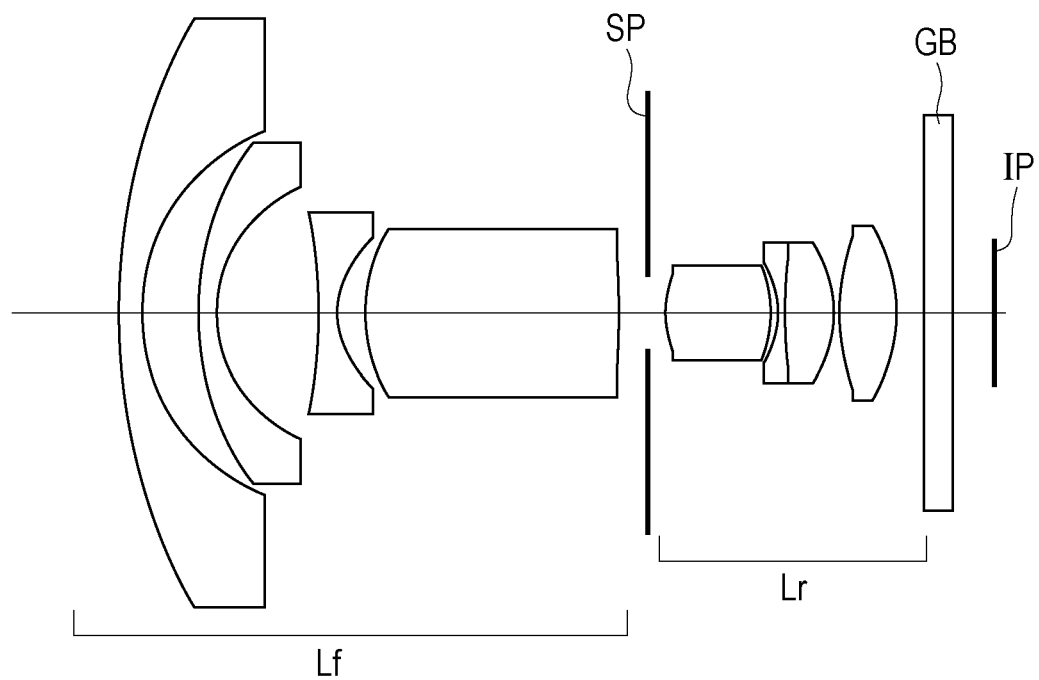
FIG. 11 is a lens sectional view of an optical system according to a sixth embodiment.
Figure 12:
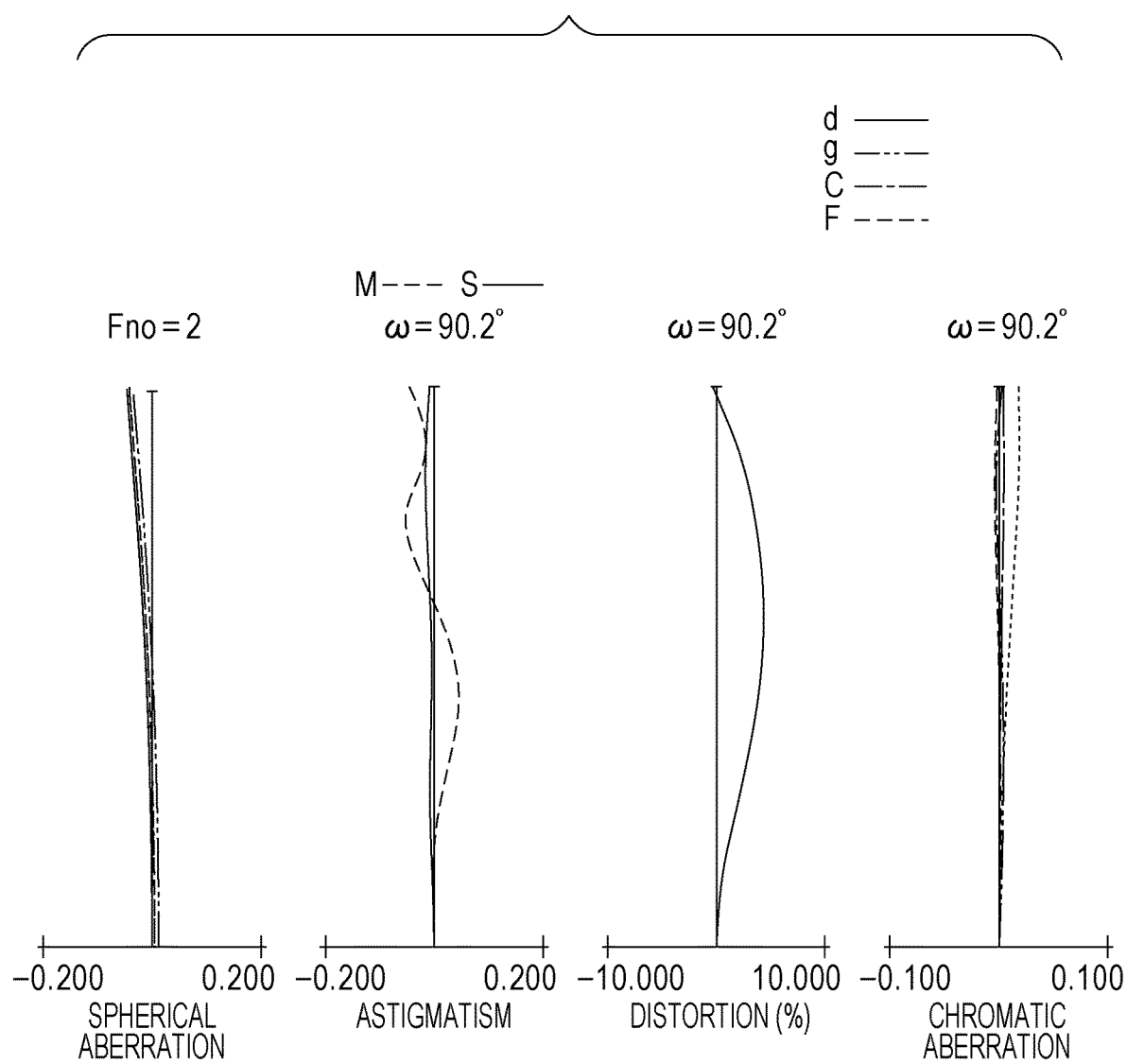
FIG. 12 is an aberration diagram of the optical system according to the sixth embodiment.

FIG. 7 is a lens sectional view of an optical system according to a fourth embodiment. FIG. 8 is an aberration diagram of the optical system of the fourth embodiment. The optical system of the fourth embodiment has a half angle of view of 93.20° and an F-number of about 2.80. FIG. 9 is a lens sectional view of an optical system according to a fifth embodiment. FIG. 10 is an aberration diagram of the optical system of the fifth embodiment. The optical system of the fifth embodiment has a half angle of view of 97.00° and an F-number of about -2.40. FIG. 11 is a lens sectional view of an optical system according to a sixth embodiment. FIG. 12 is an aberration diagram of the optical system of the sixth embodiment. The optical system of the sixth embodiment has a half angle of view of 90.20° and an F-number of about 2.00.

Figure 13:
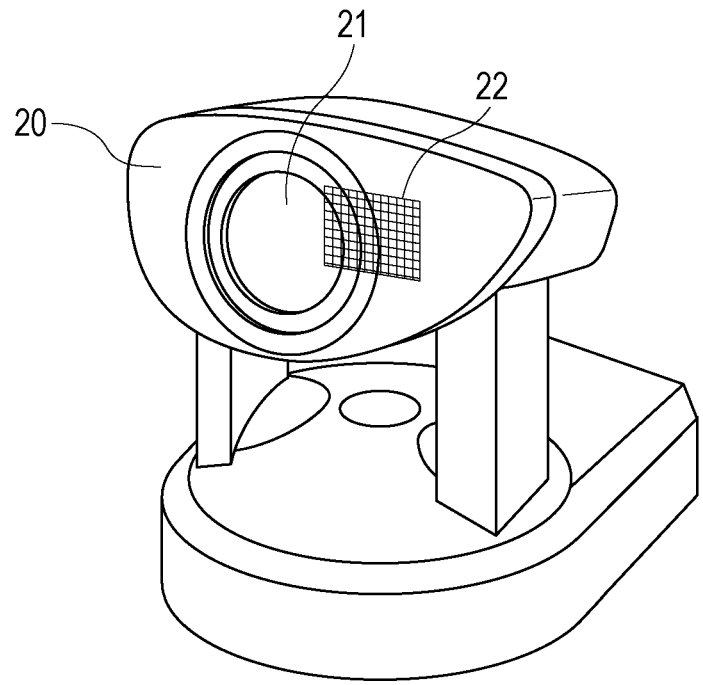
FIG. 13 is a schematic view of a principal part of at least one embodiment of an image pickup apparatus according to the present disclosure.

FIG. 13 is a schematic view of a principal part of at least one embodiment of a monitoring camera (image pickup apparatus) including the optical system of the present disclosure. The optical system of each of the embodiments is an image taking lens system used in an image pickup apparatus such as a digital still camera, a video camera, a monitoring camera, or a broadcasting camera. In each lens sectional view, the left side is the object side, and the right side is the image side. In each lens sectional view, Lf denotes a front unit, and Lr denotes a rear unit. SP represents an aperture stop.

GB denotes an optical block corresponding to an optical filter, a face plate, a low-pass filter, or an infrared cut-off filter, and IP represents an image plane. When at least one embodiment of the optical system of the present disclosure is used as an image pickup optical system for a video camera or a monitoring camera, the image plane IP corresponds to a solid-state image pickup element (photoelectric conversion element) such as a CCD sensor or a CMOS sensor. When at least one embodiment of the optical system of the present disclosure is used as an image pickup optical system for a silver-halide film camera, the image plane IP corresponds to a film surface.

In each spherical aberration diagram, Fno denotes the F-number and shows spherical aberrations for a g-line (wavelength 435.8 nm), an F-line (wavelength 486.1 nm), a C-line (wavelength 656.3 nm), and a d-line (wavelength 587.6 nm). In each astigmatism diagram, S denotes a sagittal image plane, and M denotes a meridional image plane. Distortion aberration is shown for the d-line. In each chromatic aberration diagram, lateral chromatic aberrations for the g-line, the F-line, the C-line, and the d-line are shown, and ω denotes the image pickup half angle of view. The distortion aberration is shown as the distortion amount in a stereographic projection method to be described later.

At least one embodiment of the optical system of the present disclosure has an angle of view of about 180°, and is intended to be mainly used as a fish-eye lens. As projection methods of the fish-eye lens, an orthogonal projection method, an equisolid angle projection method, an equidistance projection method, and a stereographic projection method are known, as described above. Here, when the image height on the projection plane is designated as Y, the focal length of the entire optical system is designated as f, and the half angle of view is designated as ω, the projection methods are expressed by the following expressions:

Orthogonal projection method: $Y=f\times\sin\omega$ (A)

Equisolid angle projection method: $Y=2f\times\sin(\omega/2)$ (B)

Equidistance projection method: $Y=f\times\omega$ (C)

Stereographic projection method: $Y=2f\times\tan(\omega/2)$ (D)

Figure 14:
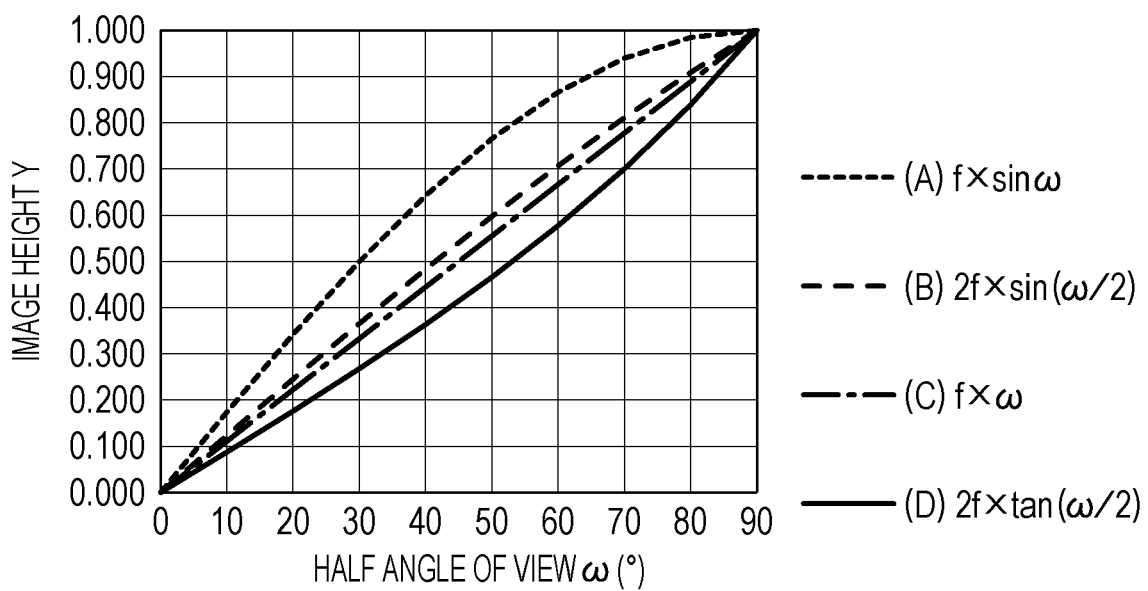
FIG. 14 shows characteristics of projection methods.

FIG. 14 schematically shows the relationship between the half angle of view and the image height when the image height at a half angle of view of 90° is 1 in the projection methods. In (A) the orthogonal projection method, an image is not so strongly compressed near the center of the image area, but is strongly compressed on the periphery of the image area. In contrast, in (D) the stereographic projection method, an image is strongly compressed near the center of the image area, but is not so strongly compressed on the periphery of the image area. In the stereographic projection method, since the degree of deformation of the image is low in the peripheral area, the influence of aberration is also conspicuous in the peripheral area. For this reason, the optical system provided for the stereographic projection method is also required to have high optical performance in the peripheral area.

A monitoring camera is also required to take a clear peripheral image, and the stereographic projection method is often used when a fish-eye lens is applied to the monitoring camera. At least one embodiment of the optical system of the present disclosure is intended to be mainly used in the fish-eye lens. To obtain high optical performance in the stereographic projection method, the optical system is required to be properly corrected for distortion aberration and spherical aberration.

In at least one embodiment of the optical system of the present disclosure, a positive lens and at least three negative lenses are disposed in the front unit Lf. To achieve wide viewing angle, an off-axis light beam needs to be greatly refracted by the negative lenses disposed on the object side in the front unit Lf. To greatly refract the light beam, it is necessary to increase the refractive power of the negative lenses. Here, when the off-axis light beam is greatly refracted by a small number of negative lenses, the refractive power of each negative lens excessively increases, and much distortion aberration, field curvature, and astigmatism occur. Further, it is difficult to correct lateral chromatic aberration and axial chromatic aberration in a well-balanced manner.

In at least one embodiment of the present disclosure, the negative refractive power is shared by at least three negative lenses disposed in the front unit Lf. This can reduce the refractive power of the negative lenses included in the front unit Lf, and can effectively suppress the occurrence of distortion aberration, field curvature, astigmatism, and so on. Further, lateral chromatic aberration and axial chromatic aberration can be corrected in a well-balanced manner.

The optical system of each of the embodiments satisfies the following conditional Expressions:

$$\theta gF + 0.00163 \times \nu d > 0.665 \quad (1)$$

$$\nu d < 30.00 \quad (2)$$

$$-0.30 < ff/f < 0.25 \quad (3).$$

where νd represents the Abbe number of the material of a negative lens Gn having the smallest Abbe number among the negative lenses included in the front unit Lf, θgF represents the partial dispersion ratio, ff represents the focal length of the front unit Lf, and f represents the focal length of the entire optical system.

Here, the Abbe number νd and the partial dispersion ratio θgF are values expressed as follows:

$$\nu d = (Nd-1)/(NF-NC)$$

$$\theta gF = (Ng-Nf)/(NF-NC).$$

where Ng, NF, NC and Nd respectively denote the refractive indices of the material for the g-line (wavelength 435.8 nm), the F-line (wavelength 486.1 nm), the C-line (wavelength 656.3 nm), and the d-line (wavelength 587.6 nm).

Figure 15:
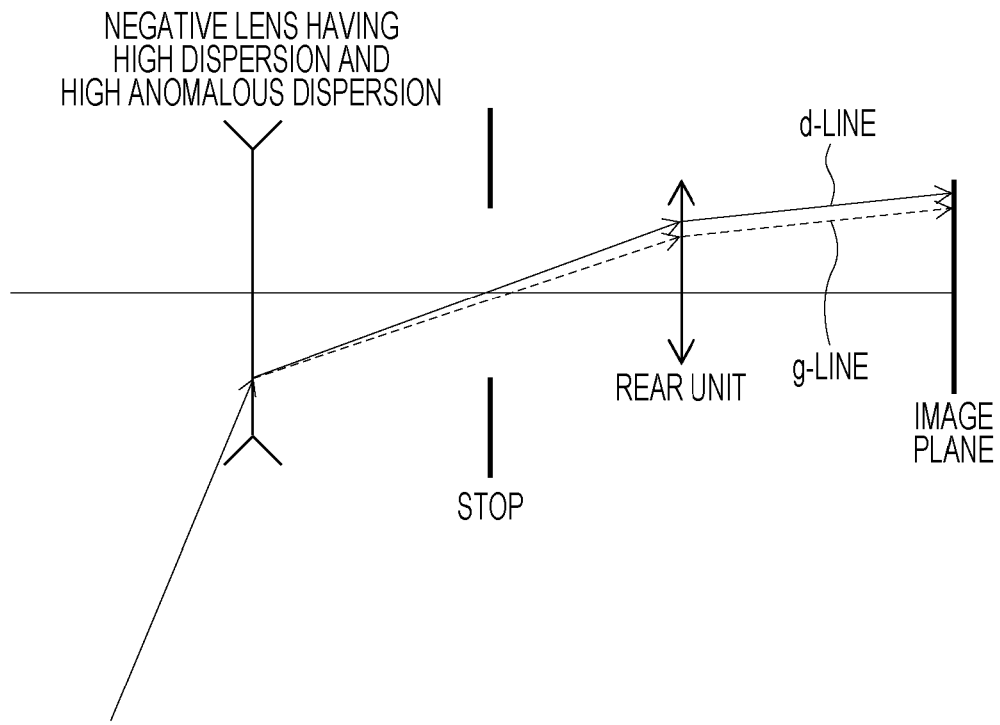
FIG. 15 shows the principle of correction of lateral chromatic aberration.

The principle of correction of lateral chromatic aberration will be described with reference to FIG. 15. In at least one embodiment of the optical system of the present disclosure, lateral chromatic aberration is corrected by using a material having a high dispersion (low Abbe number) and a high anomalous dispersion for the negative lenses included in the front unit Lf. FIG. 15 schematically illustrates the optical path in an optical system having a negative lens included in the front unit Lf and having a high dispersion and a high anomalous dispersion, an aperture stop, and a rear unit having a positive refractive power.

In general, in a superwide-angle lens of a retrofocus type, such as a fish-eye lens, an image is formed in an area where the image height on the image plane is large and at a position where the g-line is located far from the optical axis than the d-line. As illustrated in FIG. 15, the image forming position at the g-line can be shifted closer to the optical axis by using the material having a high dispersion and a high anomalous dispersion for the negative lens included in the front unit Lf. Thus, lateral chromatic aberration at the g-line can be properly corrected.

Figure 16:
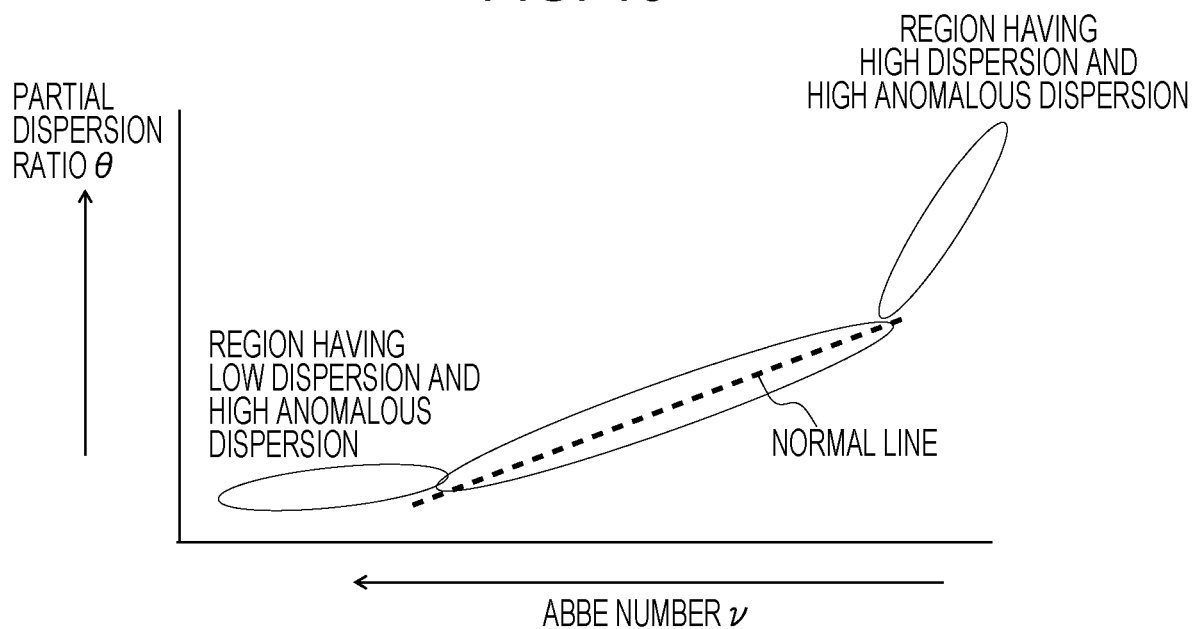
FIG. 16 shows the relationship between the Abbe number and the partial dispersion ratio of the material used for the lens.

FIG. 16 shows the distribution of materials used for the lens. In FIG. 16, the vertical line shows a partial dispersion ratio $\theta gF$, and the horizontal axis shows an Abbe number $vd$. A straight line shown by a broken line is a normal line. Most materials used for the lens are distributed near the normal line. Materials distributed at positions located far from the normal line have an anomalous dispersion. As shown in FIG. 16, the materials having an anomalous dispersion are concentrated in a low-dispersion region and a high-dispersion region.

It is not preferable to use a material that does not satisfy Conditional Expressions (1) and (2) as the material of the negative lens Gn because it is difficult to properly correct lateral chromatic aberration.

Conditional Expression (3) defines the ratio of the focal length ff of the front unit Lf and the focal length f of the entire optical system. When the value is smaller than the lower limit value of Conditional Expression (3), the negative refractive power of the front unit Lf becomes too strong, and the diverging effect of the marginal ray near the aperture stop is too large. As a result, it is necessary to increase the refractive power of the positive lens disposed in the rear unit Lr near the aperture stop, and this makes it difficult to properly correct spherical aberration occurring in the rear unit Lr. Further, if the positive refractive power is dispersed by increasing the number of positive lenses included in the rear unit Lr in order to correct spherical aberration, the number of lenses increases, and this increases the total size of the optical system.

When the value is larger than the upper limit value of Conditional Expression (3), the positive refractive power of the front unit Lf becomes too strong, and the converging effect of the marginal ray near the aperture stop becomes too large. As a result, the height of a light beam entering the rear unit Lr becomes too small, and it is difficult to properly correct aberration, such as axial chromatic aberration, occurring in the front unit Lf.

In each embodiment, the elements are appropriately set to satisfy Conditional Expressions (1) to (3), as described above. Thus, it is possible to obtain a compact and wide-angle zoom lens having high optical performance.

In each embodiment, the numerical ranges of Conditional Expressions (1) to (3) are preferably set as follows:

$$\theta gF + 0.00163 \times vd > 0.675 \quad (1a)$$

$$vd < 25.00 \quad (2a)$$

$$-0.25 < ff/f < 0.22 \quad (3a).$$

The numerical ranges of Conditional Expressions (1) to (3) are more preferably set as follows:

$$\theta gF + 0.00163 \times vd > 0.685 \quad (1b)$$

$$vd < 20.00 \quad (2b)$$

$$-0.20 < ff/f < 0.20 \quad (3b).$$

Further, in each embodiment, at least one of the following conditional expressions is preferably satisfied:

$$-25.00 < fn/f < -2.00 \quad (4)$$

$$1.20 < (GnR1+GnR2)/(GnR1-GnR2) < 8.00 \quad (5)$$

$$1.20 < vna/vpa < 5.00 \quad (6)$$

$$0.00 \leq |(R1+R2)|/(R1-R2) \leq 1.00 \quad (7)$$

$$7.00 < TD/f < 45.00 \quad (8).$$

Here, fn represents the focal length of the negative lens Gn, GnR1 represents the curvature radius of an object-side lens surface of the negative lens Gn, and GnR2 represents the curvature radius of an image-side lens surface of the negative lens Gn. Further, vna represents the average value of the Abbe numbers of the materials of all negative lenses included in the front unit Lr, and vpa represents the average value of the Abbe numbers of the materials of all positive lenses included in the front unit Lf. Still further, R1 represents the curvature radius of a lens surface of the rear unit Lr closest to the object side, R2 represents the curvature radius of a lens surface of the rear unit Lr closest to the image side, and TD represents the distance on the optical axis from a lens surface of the front unit Lf closest to the object side to the lens surface of the rear unit Lr closest to the image side.

Conditional Expression (4) defines the ratio of the focal length fn of the negative lens Gn and the focal length f of the entire optical system. When the value is smaller than the lower limit value of Conditional Expression (4), the refractive power of the negative lens Gn becomes too weak. As a result, it is difficult to properly correct lateral chromatic aberration. When the value is larger than the upper limit value of Conditional Expression (4), the refractive power of the negative lens Gn becomes too strong. As a result, it is difficult to properly correct distortion aberration, curvature of field, and astigmatism, and much axial chromatic aberration occurs.

Conditional Expression (5) defines the shape of the negative lens Gn. Conditional Expression (5) shows that the negative lens Gn has a meniscus shape that is convex to the object side. When the value is smaller than the lower limit value of Conditional Expression (5), the curvature radius of the object-side lens surface of the negative lens Gn becomes too large. As a result, the refracting angle of the light beam that forms an image at the peripheral image height becomes too large, and much distortion aberration, field curvature, and astigmatism occur. When the value is larger than the upper limit value of Conditional Expression (5), the curvature radius of the object-side lens surface of the negative lens Gn is too close to the curvature radius of the image-side lens surface. As a result, the negative refractive power of the negative lens Gn becomes too weak, and it is difficult to achieve a sufficiently wide viewing angle.

Conditional Expression (6) defines the ratio of the average value vna of the Abbe numbers of the materials of all negative lenses included in the front unit Lf and the average value vpa of the Abbe numbers of the materials of all positive lenses included in the front unit Lf. When the value is larger than the upper limit value or smaller than the lower limit value of Conditional Expression 6, the achromatic effect of the C-line and the F-line in the front unit Lf decreases, and it is difficult to properly correct chromatic aberration.

Conditional Expression (7) defines the curvature radius R1 of the lens surface of the rear unit Lr closest to the object side and the curvature radius R2 of the lens surface of the rear unit Lr closest to the image side. Conditional Expression (7) shows that both the lens surface of the rear unit Lr closest to the object side and the lens surface of the rear unit Lr closest to the image side are convex surfaces. By forming the lens surface of the rear unit Lr closest to the object side by a convex surface, the height of the on-axis marginal ray passing through the rear unit Lr can be decreased. Thus, it is possible to shorten the effective diameter of the lenses included in the rear unit Lr and, as a result, to reduce the total size of the lens system.

By forming the lens surface of the rear unit Lr closest to the image side by a convex surface, telecentricity can be enhanced. When at least one embodiment of the optical system of the present disclosure is used in an image pickup apparatus including an image pickup element, it is preferable that a light beam should enter a light-receiving surface of the image pickup element from the perpendicular direction. If the incident angle of the light beam on the light-receiving surface increases, the light quantity decreases particularly at the peripheral image height, and the peripheral light quantity ratio becomes too low. In at least one embodiment of the present disclosure, the decrease in peripheral light quantity ratio is prevented by forming the lens surface of the rear unit Lr closest to the image side by a convex surface to enhance telecentricity. When the value is larger than the upper limit value or smaller than the lower limit value of Conditional Expression (7), it is difficult to suppress the decrease in peripheral light quantity ratio while achieving size reduction of the entire lens system.

Conditional Expression (8) defines the ratio of the overall lens length TD of the entire optical system and the focal length f of the entire optical system. To shorten the overall lens length TD to be smaller than the lower limit value of Conditional Expression (8), it is necessary to increase the refractive powers of the lens surfaces. When the refractive powers of the lens surfaces are increased, various aberrations occur, and this deteriorates optical performance of the optical system. When the overall lens length TD increases to be larger than the upper limit value of Conditional Expression (8), the total size of the optical system is increased.

The numeral ranges of Conditional Expressions (4) to (8) are preferably set as follows:

$$-20.00 < fn/f < -3.00 \tag{4a}$$

$$1.50 < (GnR1+GnR2)/(GnR1-GnR2) < 7.00 \tag{5a}$$

$$1.30 < vna/vpa < 4.00 \tag{6a}$$

$$0.03 \leq |(R1+R2)|/(R1-R2) \leq 0.80 \tag{7a}$$

$$10.00 < TD/f < 40.00 \tag{8a}$$

The numeral ranges of Conditional Expressions (4) to (8) are more preferably set as follows:

$$-15.00 < fn/f < -4.00 \tag{4b}$$

$$2.00 < (GnR1+GnR2)/(GnR1-GnR2) < 6.00 \tag{5b}$$

$$1.40 < vna/vpa < 3.00 \tag{6b}$$

$$0.05 \leq |(R1+R2)|/(R1-R2) \leq 0.75 \tag{7b}$$

$$12.00 < TD/f < 35.00 \tag{8b}$$

The front unit Lf is preferably composed of seven or less lenses. In each embodiment, the optical system has an angle of view of about 180°, the effective diameter of each lens included in the front unit Lf is apt to be large, and the weight of each lens is also apt to be large. By composing the front unit Lf of seven or less lenses, the total weight of the front unit Lf can be effectively reduced. The rear unit Lr is preferably composed of five or less lenses. This can effectively achieve size reduction and weight reduction of the entire lens system.

In each embodiment, at least two aspherical lenses are preferably disposed in the optical system. By properly using the aspherical lenses, field curvature, astigmatism, and spherical aberration can be corrected well. In particular, an aspherical lens that is convex to the image side is preferably disposed on a side of the rear unit Lr closest to the image side. This can make the incident light angle on the image pickup element close to a telecentric condition, and can suppress the decrease in peripheral light quantity ratio.

When at least one embodiment of the optical system of the present disclosure is applied to an image pickup apparatus including an image pickup element that receives an image formed by the optical system, the following conditional expressions are preferably satisfied:

$$85° < \omega \, max < 120° \tag{9}$$

$$1.55 < Y80/f < 1.80 \tag{10}$$

$$0.20 < f^2/(Y80 \times Fno) < 2.50 \tag{11}$$

Here, ω max represents the maximum half angle of view, Y80 represents the image height on the image pickup element at an angle of view of 80°, f represents the focal length of the entire optical system, and Fno represents the full aperture F-number of the optical system at infinity.

When the maximum half angle of view ω max decreases to be smaller than the lower limit value of Conditional Expression (9), a sufficiently wide viewing angle cannot be achieved. When the maximum half angle of view ω max increases to be larger than the upper limit value of Conditional Expression (9), the amount of information at each angle of view decreases, and this deteriorates resolution.

Conditional Expression (10) defines the shift of the image height at which a light beam having a half angle of view of 80° forms an image. In the stereographic projection method, the image height is determined by the focal length and the half angle of view, as described above. Here, when an image of a subject is formed on an imaging surface via the optical system in the stereographic projection method, distortion aberration occurs, and the image height shifts. When the value is smaller than the lower limit value of Conditional Expression (10), the image height at which the light beam having the half angle of view of 80° forms an image is too lower than the ideal image height, and information near the optical axis is excessively compressed. This may deteriorate image quality. When the value is larger than the upper limit value of Conditional Expression (10), the image height at which the light beam having the half angle of view of 80° forms an image is too higher than the ideal image height, and information in the peripheral area is excessively compressed. This may deteriorate image quality.

Conditional Expression (11) defines the hyperfocal distance of a pan-focus optical system. In the pan-focus optical system, all subject distances in a range from half the hyperfocal distance to infinity are within the depth of field. The closest in-focus distance is ½ of a hyperfocal distance sh. Here, the hyperfocal distance sh is expressed by $sh=f^2/(\varepsilon \times Fno)$ where $\varepsilon$ represents the diameter of the permissible circle of confusion. The diameter $\varepsilon$ of the permissible circle of confusion is proportional to a pixel pitch p, and is expressed by $\varepsilon \propto p$. Further, when pixels are uniformly arranged in the image pickup element, since the pixel pitch p is proportional to the image height Y, the hyperfocal distance sh is proportional to $f^2/(Y \times Fno)$.

When the value is smaller than the lower limit value of Conditional Expression (11), the full aperture F-number Fno at infinity becomes too large, and it is difficult to ensure sufficient brightness. Moreover, the focal length f of the entire optical system becomes too short, and much aberration occurs. When the value is larger than the upper limit value of Conditional Expression (11), the closest in-focus distance increases, and the image taking area is narrowed.

In each embodiment, numerical ranges of Conditional Expressions (9) to (11) are preferably set as follows:

$$87° < \omega \max < 115° \qquad (9a)$$

$$1.59 < Y80/f < 1.77 \qquad (10a)$$

$$0.25 < f^2/(Y80 \times Fno) < 2.00 \qquad (11a).$$

The numerical ranges of Conditional Expressions (9) to (11) are more preferably set as follows:

$$89° < \omega \max < 110° \qquad (9b)$$

$$1.63 < Y80/f < 1.73 \qquad (10b)$$

$$0.30 < f^2/(Y80 \times Fno) < 1.50 \qquad (11b).$$

Next, the lens configurations in the embodiments will be described. In the optical systems of the first embodiment and the second embodiment, the front unit Lf consists of three negative lenses each having a meniscus shape that is convex to the object side and a cemented lens of a biconcave negative lens and a biconvex positive lens, which are arranged in order from the object side to the image side. By forming both surfaces of the third negative lens from the object side by aspherical surfaces, field curvature is corrected well. The second negative lens from the object side corresponds to the negative lens Gn having the smallest Abbe number among the negative lenses included in the front unit Lf.

The rear unit Lr consists of a biconvex positive lens, a cemented lens of a biconcave negative lens and a biconvex positive lens, and a biconvex positive lens, which are arranged in order from the object side to the image side. By forming both surfaces of the positive lens closest to the image side by aspherical surfaces, field curvature and spherical aberration are corrected well.

In the optical system of the third embodiment, the front unit Lf consists of three negative lenses each having a meniscus shape that is convex to the object side, a biconcave negative lens, and a cemented lens of a meniscus negative lens that is convex to the object side and a biconvex positive lens, which are arranged in order from the object side to the image side. By forming both surfaces of the third negative lens from the object side by aspherical surfaces, field curvature is corrected well. The fifth negative lens from the object side corresponds to the negative lens Gn. The rear unit Lr consists of a biconvex positive lens, a cemented lens of a biconvex positive lens and a biconcave negative lens, and a biconvex positive lens, which are arranged in order from the object side to the image side. By forming both surfaces of the positive lens in the rear unit Lr closest to the object side and both surfaces of the positive lens in the rear unit Lr closest to the image side by aspherical surfaces, field curvature and spherical aberration are corrected well.

In the optical system of the fourth embodiment, the configuration of the front unit Lf is the same as that of the third embodiment. The rear unit Lr consists of a biconvex positive lens, a cemented lens of a meniscus positive lens that is convex to the image side and a biconcave negative lens, a biconvex positive lens, and a biconvex positive lens, which are arranged in order from the object side to the image side. By forming both surfaces of the positive lens closest to the object side and both surfaces of the positive lens closest to the image side by aspherical surfaces, field curvature and spherical aberration are corrected well. In the optical system according to the fifth embodiment, configurations of the front unit Lf and the rear unit Lr are the same as those adopted in the third embodiment.

In the optical system according to the sixth embodiment, the front unit Lf consists of two meniscus negative lenses each of which is convex to the object side, a biconcave negative lens, and a biconvex positive lens, which are arranged in order from the object side to the image side. By forming both surfaces of the third negative lens from the object side by aspherical surfaces, field curvature is corrected well. The second negative lens from the object side corresponds to the negative lens Gn. The configuration of the rear unit Lr is the same as that adopted in the first and second embodiments.

Next, lens data in first to sixth numerical embodiments corresponding to the first to sixth embodiments of the present disclosure will be shown. In each numerical embodiment, i represents the order of an optical surface from the object side, ri represents the curvature radius of the i-th optical surface (i-th surface), di represents the distance between the i-th surface and the (i+1)-th surface, and ndi and vdi represent the refractive index and Abbe number, respectively, of the material of the i-th optical member for the d-line.

When K represents the eccentricity, A4, A6, A8, and A10 each represent the aspherical surface coefficient, and x represents the displacement amount from the surface vertex in the optical-axis direction at a height h from the optical axis, the aspherical surface shape is expressed by the following expression:

$$x=(h^2/r)/[1+[1-(1+K)(h/r)^2]^{1/2}]+A4h^4+A6h^6+A8h^8+A10h^{10}$$

where r represents the paraxial curvature radius. Further, $|e-Z|$ means $|10^{-Z}|$. In each embodiment, the partial dispersion ratio θgF and the focal length fn of the lens corresponding to the negative lens Gn are also shown.

In each embodiment, the back focus (BF) refers to the distance from the surface of the lens system closest to the image side to the image plane expressed by the equivalent air length. Table shows the correspondences of the numerical embodiments to the above-described conditional expressions.

First Numerical Embodiment

Unit mm
Surface data

| Surface number | r | d | nd | νd | θgF | fn |
|---|---|---|---|---|---|---|
| 1 | 24.640 | 1.25 | 1.77250 | 49.6 | | |
| 2 | 10.334 | 3.08 | | | | |
| 3 | 13.519 | 1.00 | 1.95906 | 17.5 | 0.6598 | −16.79 |
| 4 | 7.083 | 4.69 | | | | |
| 5* | 8.181 | 1.00 | 1.76802 | 49.2 | | |
| 6* | 3.330 | 3.00 | | | | |
| 7 | −13.041 | 0.60 | 1.59522 | 67.7 | | |
| 8 | 8.521 | 6.87 | 2.00069 | 25.5 | | |
| 9 | −15.485 | 1.65 | | | | |
| 10 (Stop) | ∞ | 1.10 | | | | |
| 11 | 5.634 | 4.46 | 1.49700 | 81.5 | | |
| 12 | −5.636 | 0.51 | | | | |
| 13 | −4.287 | 0.40 | 1.85478 | 24.8 | | |
| 14 | 10.208 | 2.72 | 1.49700 | 81.5 | | |
| 15 | −6.064 | 0.33 | | | | |
| 16* | 9.089 | 3.52 | 1.55332 | 71.7 | | |
| 17* | −7.138 | 1.46 | | | | |
| 18 | ∞ | 1.60 | 1.51630 | 64.1 | | |
| 19 | ∞ | 2.00 | | | | |
| Image plane | ∞ | | | | | |

Aspherical surface data

Fifth surface

K = −1.74182e+000   A 6 = −5.36705e−005   A 8 = 1.23192e−006
A 10 = −3.06369e−009

Sixth surface

K = −1.16929e+000   A 4 = 1.39638e−003   A 6 = −1.20156e−004
A 8 = −1.51135e−006   A 10 = 2.35477e−007

Sixteenth surface

K = −1.89973e+000   A 4 = −6.45750e−004   A 6 = 2.02657e−005
A 8 = −1.14090e−006   A 10 = 1.46887e−008

Seventeenth surface

K = −7.98305e−001   A 4 = 7.08293e−004   A 6 = −1.49882e−005

Various data

| Focal length | 2.00 |
|---|---|
| F-number | 2.00 |
| Half angle of view | 90.20 |
| Image height | 4.00 |
| Overall lens length | 36.18 |
| BF | 4.51 |

Lens unit data

| Unit | Starting surface | Focal length |
|---|---|---|
| Front unit | 1 | −15.00 |
| Rear unit | 11 | 8.00 |

Second Numerical Embodiment

Unit mm
Surface data

| Surface number | r | d | nd | νd | θgF | fn |
|---|---|---|---|---|---|---|
| 1 | 25.739 | 1.25 | 1.77250 | 49.6 | | |
| 2 | 11.637 | 3.01 | | | | |
| 3 | 14.589 | 1.00 | 1.95906 | 17.5 | 0.6598 | −23.55 |
| 4 | 8.566 | 4.89 | | | | |
| 5* | 8.545 | 1.00 | 1.76802 | 49.2 | | |
| 6* | 3.330 | 5.07 | | | | |
| 7 | −8.737 | 0.60 | 1.59522 | 67.7 | | |
| 8 | 10.806 | 5.67 | 2.00069 | 25.5 | | |
| 9 | −14.548 | 1.87 | | | | |

-continued

| | Unit mm | | | |
|---|---|---|---|---|
| | Surface data | | | |
| 10 (Stop) | ∞ | 1.10 | | |
| 11 | 5.558 | 4.86 | 1.49700 | 81.5 |
| 12 | −5.560 | 0.54 | | |
| 13 | −4.083 | 0.40 | 1.85478 | 24.8 |
| 14 | 11.045 | 2.71 | 1.49700 | 81.5 |
| 15 | −6.148 | 1.24 | | |
| 16* | 9.090 | 3.98 | 1.55332 | 71.7 |
| 17* | −7.140 | 1.46 | | |
| 18 | ∞ | 1.60 | 1.51630 | 64.1 |
| 19 | ∞ | 2.00 | | |
| Image plane | ∞ | | | |

Aspherical surface data

Fifth surface

K = 3.37697e−001   A 6 = −6.93664e−005   A 8 = 1.99836e−006
A 10 = −2.02822e−008

Sixth surface

K = −1.03997e+000   A 4 = 1.46726e−003   A 6 = −9.52085e−005
A 8 = −1.69641e−006   A 10 = 2.26511e−007

Sixteenth surface

K = −1.06802e+000   A 4 = −7.50562e−004   A 6 = 2.07296e−005
A 8 = −1.04976e−006   A 10 = 1.28819e−008

Seventeenth surface

K = −6.65735e−001   A 4 = 6.16060e−004   A 6 = −1.49996e−005

Various data

| | |
|---|---|
| Focal length | 2.00 |
| F-number | 2.00 |
| Half angle of view | 90.20 |
| Image height | 4.00 |
| Overall lens length | 39.19 |
| BF | 4.51 |

Lens unit data

| Unit | Starting surface | Focal length |
|---|---|---|
| Front unit | 1 | −12.00 |
| Rear unit | 11 | 8.97 |

Third Numerical Embodiment

| | Unit mm | | | | | |
|---|---|---|---|---|---|---|
| | Surface data | | | | | |
| Surface number | r | d | nd | vd | θgF | fn |
| 1 | 25.195 | 1.20 | 1.80400 | 46.6 | | |
| 2 | 11.653 | 5.00 | | | | |
| 3 | 14.557 | 0.70 | 2.00100 | 29.1 | | |
| 4 | 6.859 | 4.19 | | | | |
| 5* | 20.501 | 0.50 | 1.80610 | 40.7 | | |
| 6* | 5.716 | 3.99 | | | | |
| 7 | −73.177 | 0.45 | 1.59522 | 67.7 | | |
| 8 | 9.142 | 0.86 | | | | |
| 9 | 13.936 | 0.45 | 2.10205 | 16.8 | 0.6721 | −15.13 |
| 10 | 7.462 | 10.57 | 2.00069 | 25.5 | | |
| 11 | −13.962 | 4.64 | | | | |
| 12 (Stop) | ∞ | 2.56 | | | | |
| 13* | 6.320 | 1.94 | 1.49710 | 81.6 | | |
| 14* | −17.197 | 0.09 | | | | |
| 15 | 66.768 | 1.39 | 1.49700 | 81.5 | | |
| 16 | −5.178 | 0.45 | 1.84666 | 23.8 | | |
| 17 | 16.143 | 2.64 | | | | |
| 18* | 13.935 | 3.54 | 1.55332 | 71.7 | | |
| 19* | −5.438 | 1.20 | | | | |
| 20 | ∞ | 1.50 | 1.51630 | 64.1 | | |

-continued

| Unit mm Surface data | | |
|---|---|---|
| 21 | ∞ | 2.24 |
| Image plane | ∞ | |

Aspherical surface data

Fifth surface

| K = 2.00114e+000 | A 4 = −1.01987e−004 | A 6 = −5.72800e−006 |
|---|---|---|
| A 8 = −7.90180e−008 | A 10 = 2.62920e−009 | |

Sixth surface

| K = −7.26641e−002 | A 4 = −3.63561e−004 | A 6 = −2.44288e−005 |
|---|---|---|
| A 8 = −2.31468e−007 | A 10 = −2.01264e−009 | |

Thirteenth surface

| K = −3.51840e+000 | A 4 = 2.29819e−003 | A 6 = 3.07570e−004 |
|---|---|---|
| A 8 = −3.86576e−005 | A 10 = 3.46968e−006 | |

Fourteenth surface

| K = 4.84763e+000 | A 4 = 1.34834e−003 | A 6 = 2.43191e−004 |
|---|---|---|

Eighteenth surface

| K = −3.04798e+000 | A 4 = −6.21861e−004 | A 6 = 2.90573e−005 |
|---|---|---|
| A 8 = 1.09122e−006 | A 10 = −4.37169e−008 | |

Nineteenth surface

| K = −3.38885e+000 | A 4 = −1.03947e−003 | A 6 = 4.88982e−005 |
|---|---|---|
| A 8 = 2.37243e−007 | | |

Various data

| | |
|---|---|
| Focal length | 2.00 |
| F-number | 2.00 |
| Half angle of view | 100.00 |
| Image height | 4.76 |
| Overall lens length | 45.16 |
| BF | 4.43 |

Lens unit data

| Unit | Starting surface | Focal length |
|---|---|---|
| Front unit | 1 | 15.03 |
| Rear unit | 13 | 9.14 |

Fourth Numerical Embodiment

| Unit mm Surface data | | | | | | |
|---|---|---|---|---|---|---|
| Surface number | r | d | nd | vd | θgF | fn |
| 1 | 30.469 | 1.20 | 1.83481 | 42.7 | | |
| 2 | 9.786 | 5.68 | | | | |
| 3* | 24.865 | 0.70 | 1.88202 | 37.2 | | |
| 4* | 7.378 | 4.35 | | | | |
| 5 | 80.368 | 0.50 | 1.80400 | 46.6 | | |
| 6 | 11.041 | 6.90 | | | | |
| 7 | −27.683 | 0.45 | 1.71300 | 53.9 | | |
| 8 | 13.140 | 0.63 | | | | |
| 9 | 16.036 | 0.45 | 1.95906 | 17.5 | 0.6598 | −28.20 |
| 10 | 9.928 | 3.91 | 2.00069 | 25.5 | | |
| 11 | −16.600 | 10.80 | | | | |
| 12 (Stop) | ∞ | 0.47 | | | | |
| 13* | 20.010 | 1.14 | 1.49710 | 81.6 | | |
| 14* | −20.005 | 0.50 | | | | |
| 15 | −14.518 | 1.06 | 1.48749 | 70.2 | | |
| 16 | −4.427 | 0.45 | 2.00100 | 29.1 | | |
| 17 | 85.011 | 0.55 | | | | |
| 18 | 14.918 | 2.34 | 1.49700 | 81.5 | | |
| 19 | −75.490 | 0.59 | | | | |

-continued

| | Unit mm Surface data | | | | |
|---|---|---|---|---|---|
| 20* | 14.013 | 2.34 | 1.55332 | 71.7 | |
| 21* | −4.798 | 9.98 | | | |
| Image plane | ∞ | | | | |

Aspherical surface data

Third surface

K = 9.26595e−001  A 4 = 1.74251e−004  A 6 = −9.19603e−008
A 8 = −6.18843e−009

Fourth surface

K = −1.55179e+000  A 4 = 3.15057e−004  A 6 = 6.87929e−006

Thirteenth surface

K = 1.16740e+000  A 4 = 1.89852e−004  A 6 = 4.36520e−004
A 8 = −2.12647e−005  A 10 = 8.21093e−007

Fourteenth surface

K = −2.35943e+000  A 4 = 6.47874e−004  A 6 = 5.69574e−004

Twentieth surface

K = −1.60281e+000  A 4 = −1.12845e−003  A 6 = 6.14929e−006
A 8 = 8.93187e−007  A 10 = −4.26931e−008

Twenty-first surface

K = −1.83970e+000  A 4 = −1.11349e−003  A 6 = −9.48115e−006
A 8 = 2.37243e−007

Various data

| | |
|---|---|
| Focal length | 1.50 |
| F-number | 2.80 |
| Half angle of view | 93.20 |
| Image height | 3.15 |
| Overall lens length | 55.00 |
| BF | 9.98 |

Lens unit data

| Unit | Starting surface | Focal length |
|---|---|---|
| Front unit | 1 | −78.27 |
| Rear unit | 13 | 8.24 |

Fifth Numerical Embodiment

| | Unit mm Surface data | | | | | |
|---|---|---|---|---|---|---|
| Surface number | r | d | nd | vd | θgF | fn |
| 1 | 25.144 | 1.20 | 1.80400 | 46.6 | | |
| 2 | 11.653 | 5.21 | | | | |
| 3 | 13.855 | 0.70 | 1.91082 | 35.3 | | |
| 4 | 6.859 | 4.19 | | | | |
| 5 | 73.515 | 0.50 | 1.73800 | 32.3 | | |
| 6 | 5.907 | 2.74 | | | | |
| 7 | −19.819 | 0.45 | 1.59522 | 67.7 | | |
| 8 | 9.142 | 1.38 | | | | |
| 9 | 14.767 | 0.45 | 1.95906 | 17.5 | 0.6598 | −16.22 |
| 10 | 7.462 | 4.52 | 2.00069 | 25.5 | | |
| 11 | −13.220 | 6.79 | | | | |
| 12 (Stop) | ∞ | 1.40 | | | | |
| 13* | 6.320 | 1.45 | 1.49710 | 81.6 | | |
| 14* | −13.855 | 0.10 | | | | |
| 15 | 66.768 | 1.14 | 1.48749 | 70.2 | | |
| 16 | −5.178 | 0.45 | 1.85478 | 24.8 | | |
| 17 | 23.099 | 3.69 | | | | |
| 18* | 13.935 | 3.98 | 1.55332 | 71.7 | | |
| 19* | −4.756 | 1.20 | | | | |

-continued

| Unit mm Surface data | | | | |
|---|---|---|---|---|
| 20 | ∞ | 1.50 | 1.51630 | 64.1 |
| 21 | ∞ | 2.28 | | |
| Image plane | ∞ | | | |

Aspherical surface data

Thirteenth surface

K = −4.32378e−001  A 4 = 2.29819e−003  A 6 = 3.07570e−004
A 8 = 4.46609e−005  A 10 = −7.05731e−006
−7.05731e−006

Fourteenth surface

K = 2.72506e+000  A 4 = 3.06342e−003  A 6 = 5.10637e−004

Eighteenth surface

K = −3.04798e+000  A 4 = −6.21861e−004  A 6 = 2.90573e−005
A 8 = 1.09122e−006  A 10 = −3.89032e−008

Nineteenth surface

K = −3.38885e+000  A 4 = −1.43938e−003  A 6 = 5.31066e−005
A 8 = 2.37243e−007

Various data

| | |
|---|---|
| Focal length | 2.02 |
| F-number | 2.40 |
| Half angle of view | 97.00 |
| Image height | 4.36 |
| Overall lens length | 40.34 |
| BF | 2.28 |

Lens unit data

| Unit | Starting surface | Focal length |
|---|---|---|
| Front unit | 1 | 471.79 |
| Rear unit | 13 | 8.23 |

Sixth Numerical Embodiment

| Unit mm Surface data | | | | | | |
|---|---|---|---|---|---|---|
| Surface number | r | d | nd | vd | θgF | fn |
| 1 | 32.507 | 1.25 | 1.48749 | 70.2 | | |
| 2 | 10.511 | 3.06 | | | | |
| 3 | 15.428 | 1.00 | 1.95906 | 17.5 | 0.6598 | −15.37 |
| 4 | 7.299 | 5.53 | | | | |
| 5* | −30.857 | 1.00 | 1.72903 | 54.0 | | |
| 6* | 3.923 | 1.59 | | | | |
| 7 | 9.089 | 13.77 | 2.00069 | 25.5 | | |
| 8 | −30.300 | 1.45 | | | | |
| 9 (Stop) | ∞ | 1.10 | | | | |
| 10 | 6.330 | 5.69 | 1.49700 | 81.5 | | |
| 11 | −6.332 | 0.41 | | | | |
| 12 | −4.591 | 0.40 | 1.85478 | 24.8 | | |
| 13 | 37.865 | 2.66 | 1.49700 | 81.5 | | |
| 14 | −6.205 | 0.30 | | | | |
| 15* | 10.007 | 3.12 | 1.55332 | 71.7 | | |
| 16* | −7.135 | 1.46 | | | | |
| 17 | ∞ | 1.60 | 1.51630 | 64.1 | | |
| 18 | ∞ | 2.00 | | | | |
| Image plane | ∞ | | | | | |

Aspherical surface data

Fifth surface

K = 3.99706e+000  A 6 = 7.54242e−007  A 8 = −4.06321e−007
A 10 = 9.99311e−009

-continued

Unit mm
Surface data

Sixth surface

K = −3.19199e+000   A 4 = 2.82797e−003   A 6 = −9.13900e−005
A 8 = −4.23232e−007   A 10 = 7.13283e−008

Fifteenth surface

K = 1.04119e+000   A 4 = −1.28724e−003   A 6 = 5.41024e−005
A 8 = −3.15358e−006   A 10 = 4.81716e−008

Sixteenth surface

K = 5.22651e−002   A 4 = 1.16275e−003   A 6 = −1.42289e−005

Various data

| | |
|---|---|
| Focal length | 2.00 |
| F-number | 2.00 |
| Half angle of view | 90.20 |
| Image height | 4.00 |
| Overall lens length | 42.33 |
| BF | 4.51 |

Lens unit data

| Unit | Starting surface | Focal length |
|---|---|---|
| Front unit | 1 | −15.00 |
| Rear unit | 10 | 8.00 |

TABLE

| | First Embodiment | Second Embodiment | Third Embodiment | Fourth Embodiment | Fifth Embodiment | Sixth Embodiment |
|---|---|---|---|---|---|---|
| Conditional Expression (1) | 0.688 | 0.688 | 0.699 | 0.688 | 0.688 | 0.688 |
| Conditional Expression (2) | 17.5 | 17.5 | 16.8 | 17.5 | 17.5 | 17.5 |
| Conditional Expression (3) | −0.13 | −0.17 | 0.13 | −0.07 | 0.004 | −0.13 |
| Conditional Expression (4) | −8.39 | −11.77 | −7.56 | −4.70 | −8.03 | −7.68 |
| Conditional Expression (5) | 3.20 | 3.84 | 3.31 | 4.25 | 3.04 | 2.80 |
| Conditional Expression (6) | 1.80 | 1.80 | 1.80 | 1.77 | 1.78 | 1.86 |
| Conditional Expression (7) | 0.12 | 0.12 | 0.08 | 0.15 | 0.14 | 0.06 |
| Conditional Expression (8) | 18.09 | 19.59 | 22.57 | 28.38 | 19.98 | 21.16 |
| Conditional Expression (9) | 90.20 | 90.20 | 100.00 | 91.60 | 97.00 | 90.20 |
| Conditional Expression (10) | 1.70 | 1.70 | 1.69 | 1.69 | 1.67 | 1.72 |
| Conditional Expression (11) | 0.59 | 0.59 | 0.59 | 1.27 | 0.50 | 0.58 |

Next, an embodiment of a monitoring camera (image pickup apparatus) using at least one embodiment of the optical system of the present disclosure as an image pickup optical system will be described with reference to FIG. 13.

In FIG. 13, reference numeral 20 denotes a monitoring camera body. An image-taking optical system 21 is configured by any of the optical systems according to the above-described first to sixth embodiments. A solid-state image pickup element 22 (photoelectric conversion element), such as a CCD sensor or a CMOS sensor, is built in the monitoring camera body 20 and receives a subject image formed by the image-taking optical system 21.

By thus applying at least one embodiment of the optical system of the present disclosure to the image pickup apparatus such as the monitoring camera, a compact and wide-angle image pickup apparatus having high optical performance can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-203191, filed Oct. 14, 2015, which is hereby incorporated by reference herein in its entirety.

What is claimed is:

1. An optical system comprising in order from an object side to an image side:
   a front unit including a plurality of lenses;
   an aperture stop; and
   a rear unit having a positive refractive power,
   wherein the front unit includes a positive lens and three or more negative lenses, and
   wherein the optical system satisfies conditional expressions:

$\theta gF+0.00163 \times vd > 0.665$, $vd < 20.00$, $-0.30 < ff/f < 0.25$ $2.00 < (GnR1+GnR2)/(GnR1-GnR2) < 8.0$, and $18.09 \leq TD/f < 45$, where vd and θgF respectively represent an Abbe number and a partial dispersion ratio of a material of a negative lens Gn having a smallest Abbe number among the negative lenses included in the front unit, ff represents a focal length of the front unit, f represents a focal length of the optical system, GnR1 represents a curvature radius of an object-side surface of the negative lens Gn, GnR2 represents a curvature radios of an image-side lens surface of the negative lens Gn, and TD represents a distance on an optical axis from a lens surface of the front unit closest to the object side to a lens surface of the rear unit closest to the image side.

2. The optical system according to claim 1, wherein a conditional expression:

$-25.00 \leq fn/f < -4.00$ is satisfied, where fn represents a focal length of the negative lens Gn.

3. The optical system according to claim 1, wherein a conditional expression:

$1.20 < vna/vpa < 5.00$ is satisfied, where vna represents an average value of Abbe numbers of materials of all negative lenses included in the front unit, and vpa represents an average value of Abbe numbers of all positive lenses included in the front unit.

4. The optical system according to claim 1, wherein a conditional expression:

$0.00 \leq |(R1+R2)|/(R1-R2) \leq 1.00$ is satisfied, where R1 represents a curvature radius of an object-side lens surface of a lens closest to the object side among lenses included in the rear unit, and R2 represents a curvature radius of an image-side lens surface of a lens closest to the image side among the lenses included in the rear unit.

5. The optical system according to claim 1, wherein the front unit consists of seven or less lenses.

6. The optical system according to claim 1, wherein the rear unit consists of five or less lenses.

7. An image pickup apparatus, comprising:
   an optical system including, in order from an object side to an image side, a front unit having a plurality of lenses, an aperture stop, and a rear unit having a positive refractive power; and
   an image pickup element configured to receive an image formed by the optical system,
   wherein the front unit includes a positive lens and three or more negative lenses, and wherein the optical systems satisfies conditional expressions:

$\theta gF+0.00163 \times vd > 0.665$, $vd < 20.00$, $-0.30 < ff/f < 0.25$, $2.00 < (GnR1+GnR2)/(GnR1-GnR2) < 8.00$, and $18.09 \leq TD/f < 45.0$, where vd and θgF respectively represent an Abbe number and a partial dispersion ratio of a material of a negative lens Gn having a smallest Abbe number among negative lenses included in the front unit, ff represents a focal length of the front unit, and f represents a focal length of the optical system, GnR1 represents a curvature radius of an object-side lens surface of the negative lens Gn, GnR2 represents a curvature radius of an image-side lens surface of the negative lens Gn, and TD represents a distance on an optical axis from a lens surface of the front unit closest to the object side to a lens surface of the rear unit closest to the image side.

8. The image pickup apparatus according to claim 7, wherein conditional expressions:

$85° < \omega\ max < 120°$; and $1.55 < Y80/f < 1.80$ are satisfied, where ω max represents a maximum half angle of view of the optical system, Y80 represents an image height at a half angle of view of 80°.

9. The image pickup apparatus according to claim 7, wherein a conditional expression:

$0.20 < f^2/(Y80 \times Fno) < 2.50$ is satisfied, where Y80 represents an image height at a half angle of view of 80°, f represents the focal length of the optical system, and Fno represents a full aperture F-number of the optical system at infinity of an object distance.

10. The optical system according to claim 1, wherein a conditional expression $\theta gF+0.00163 \times vd > 0.675$ is satisfied.

11. The optical system according to claim 1, wherein a conditional expression:

$1.55 < Y80/f < 1.8$, is satisfied, where Y80 represents an image height at a half angle of view of 80°, and f represents the focal length of the entire optical system.

12. The optical system according to claim 1, wherein the optical system is a fixed focal length optical system.

13. The optical system according to claim 1, wherein the optical system is a pan-focus optical system.

14. An optical system comprising in order from an object side to an image side:
   a front unit including a plurality of lenses;
   an aperture stop; and
   a rear unit having a positive refractive power,
   wherein the front unit includes a positive lens and three or more negative lenses, and
   wherein the optical system satisfies conditional expressions:

$\theta gF + 0.00163 \times vd > 0.665$, $vd < 20.00$, and $-0.30 < f/ff < 0.25$, $2.00 < (GnR1 + GnR2)/(GnR1 - GnR2) < 8.00$, and $18.09 \leq TD/f < 45.00$, where vd and θgF respectively represent an Abbe number and a partial dispersion ratio of a material of a negative lens Gn having a smallest Abbe number among the negative lenses included in the front unit, ff represents a focal length of the front unit, and f represents a focal length of the optical system, GnR1 represents a curvature radios of an object-side lens surface of the negative lens Gn, GnR2 represents a curvature radios of an image-side lens surface of the negative lens Gn, TD represents a distance on an optical axis from a lens surface of the front unit closest to the object side to a lens surface of the rear unit closest to the image-side, and
   wherein the optical system is a fixed focal length optical system.

* * * * *